Jan. 24, 1961  J. F. NORTON  2,969,090
SOLENOID VALVE DEVICE WITH BALANCED MOVABLE COMPONENTS
Filed May 1, 1958  2 Sheets-Sheet 1
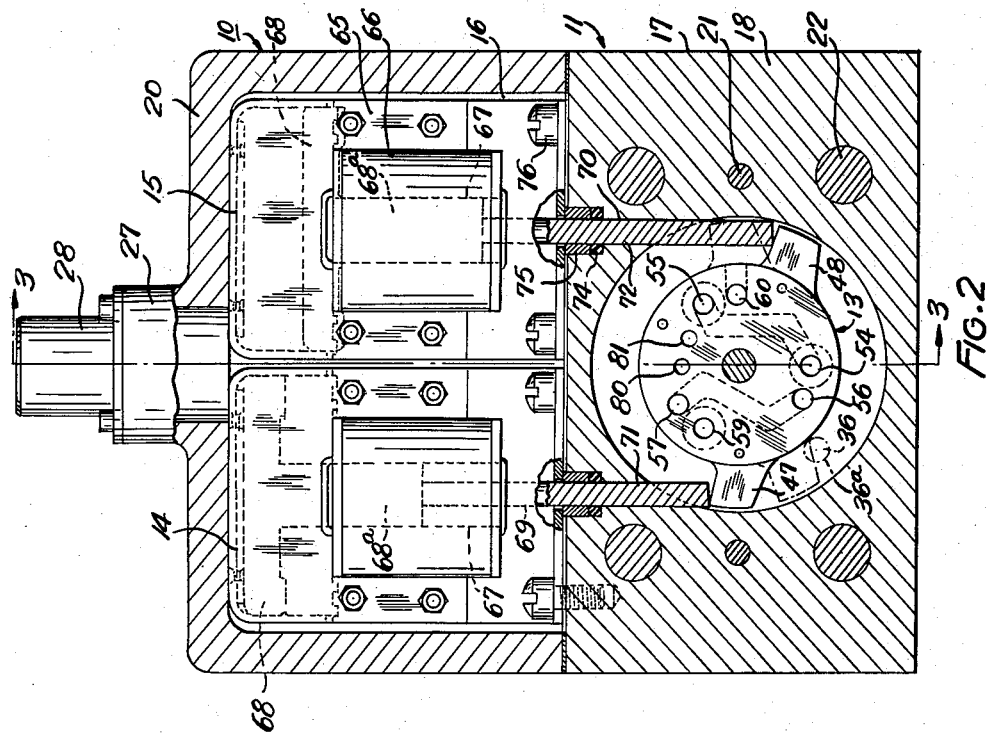
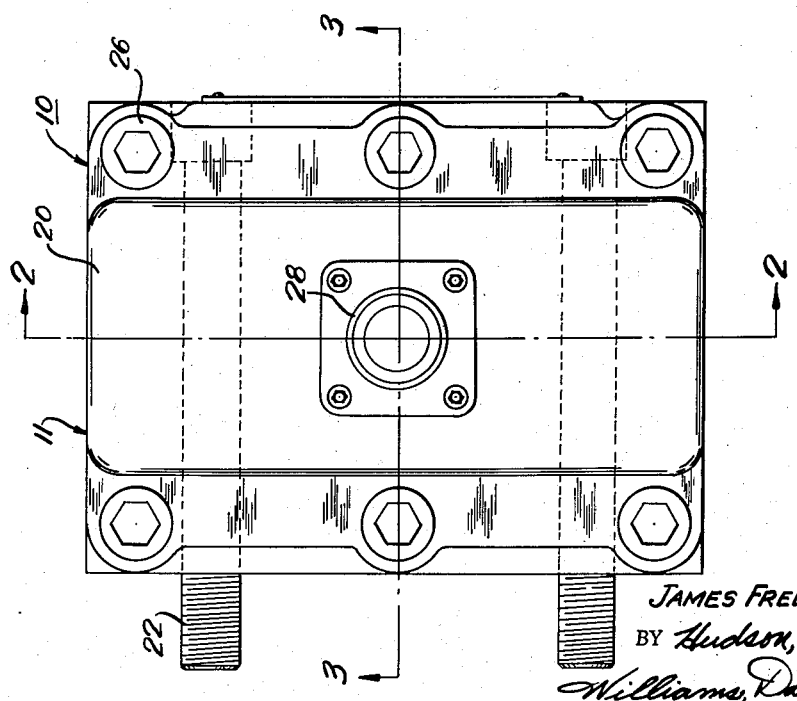
INVENTOR.
JAMES FREDERICK NORTON
BY Hudson, Boughton,
Williams, David & Hoffman
ATTORNEYS

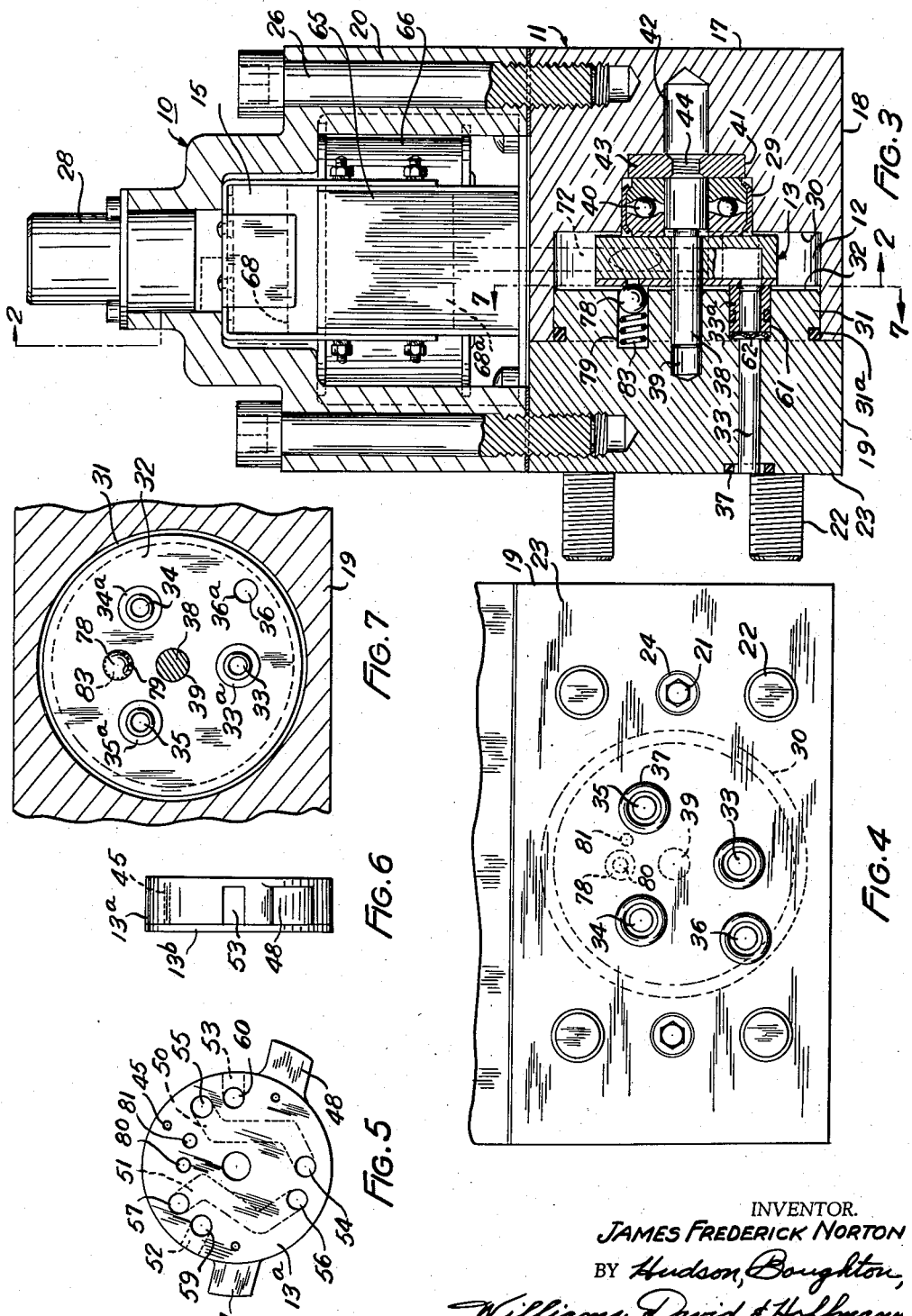

United States Patent Office 2,969,090
Patented Jan. 24, 1961

2,969,090

SOLENOID VALVE DEVICE WITH BALANCED MOVABLE COMPONENTS

James Frederick Norton, Westview Village, Ohio, assignor to Republic Manufacturing Co., Cleveland, Ohio, a corporation of Ohio Filed May 1, 1958, Ser. No. 732,353

3 Claims. (Cl. 137—624)

This invention relates to selector valves for selectively controlling the flow of fluid through different passages and, as its principal object, provides a novel valve of this type having a pivotally movable valve member actuatable by solenoid means and wherein the valve member and its actuating means are in a mechanically balanced condition rendering the valve member nonresponsive to any sudden impulse forces or shocks acting on the mechanism.

Another object is to provide a novel selector valve having such a mechanically balanced valve member and solenoid-type actuating means, and wherein the valve member is also operably disposed and mounted for ease of actuation thereof.

Still another object is to provide such a novel selector valve in which a mechanically balanced valve member is pivotally movable in opposite directions to predetermined control positions by a solenoid-type actuating means comprising a pair of solenoid devices disposed in a symmetrically balanced arrangement relative to the pivot axis of the valve member, the valve mechanism being especially suitable for use in fluid control situations where it is likely to be subjected to strong and sudden impulse forces and where accidental shifting or erratic functioning of the valve member under the influence of such forces would be objectionable.

Additionally, this invention provides a novel selector valve of the character indicated above and wherein the valve member has arm portions on opposite sides of its pivot axis and the solenoid-type actuating means comprises a pair of solenoid devices having armatures and valve actuating pins of substantially equal masses for the two solenoid devices, the armatures and pins being movable along parallel paths located at substantially equal distances on opposite sides of the pivot axis for applying the actuating movements to the arm portions of the valve member.

Other objects and advantages of the invention will be apparent in the following detailed description and in the accompanying drawings forming a part of this specification and in which:

Fig. 1 is a top plan view of a valve device embodying this invention;

Fig. 2 is a vertical section taken through the device transversely of the pivot axis of the valve member and as indicated by section line 2—2 of Figs. 1 and 3;

Fig. 3 is another vertical section taken through the device longitudinally of the pivot axis and as indicated by section line 3—3 of Figs. 1 and 2;

Fig. 4 is a partial side elevation showing the attaching portion of the device;

Figs. 5 and 6 are end and edge elevational views respectively of the valve member showing the same in detached relation; and Fig. 7 is a partial transverse vertical section taken on section line 7—7 of Fig. 3.

The valve device 10 of the present invention comprises, in general, a suitable housing 11 having a valve chamber 12 therein, and a valve member 13 pivotally movable in opposite directions in the valve chamber to different control positions for controlling the flow of fluid through the device. The valve device 10 also comprises a pair of solenoids 14 and 15 located in a solenoid chamber 16 of the housing and which are operable to move the valve member 13 to its different flow control positions.

The valve device 10 can be used for any desired application and, by way of example, is here shown as being a four-way valve suitable for controlling the supply of pressure fluid to, and the release of exhaust fluid from, opposite ends of a fluid pressure cylinder or the like. Important aspects of the valve device 10 include the characteristics that the valve member 13 is disposed and mounted for ease of actuation thereof, and that the valve member and the actuating solenoids 14 and 15 are in a stable or mechanically balanced condition and arrangement such that, notwithstanding the ease of actuation of the valve member, it will not be accidentally shiftable, or otherwise subject to erratic actuation, by reason of strong and sudden impulse forces being applied to the device.

The housing 11 comprises a lower body portion or unit 17, formed of connected body sections 18 and 19, and an upper cover section or bonnet 20. The body sections 18 and 19 are held in a clamped engagement by suitable connecting screws 21 and by suitable mounting screws 22 which extend through the body sections 18 and 19 and hold the valve device in a clamped engagement against a suitable support (not shown) such as a vehicle or structure with which the valve device 10 is to be used and which is subject to strong rapid accelerating movements or directional changes. The body section 19 is here shown as having a flat front face 23 for clamping engagement against the support and as having the heads of the connecting screws 21 located in a countersunk relation in counterbore recesses 24 of such front face.

Since the cover section 20 and the lower body portion 17 are secured by means of the bolts 22 to the movable structure on which the valve device 10 is mounted, these housing members can be considered as being relatively stationary so far as the movable components to be described hereinafter are concerned. The cover section 20 and the body portion 17 are described in the succeeding paragraphs.

The cover section 20 of the housing is here shown as being a cup-shaped member having the solenoid chamber 16 therein and is mounted on the body unit 17 by means of suitable clamping screws 26. The cover section 20 is provided at the top thereof with a hollow boss 27 which forms a mount for an electrical fitting 28 through which electrical connection is made with the solenoids 14 and 15 for supplying energizing current to the latter.

The body section 18 of the housing is in the form of a block having the valve chamber 12 recessed thereinto in the form of a cylindrical bore which includes an extension portion or recess of smaller diameter forming a bearing pocket 29 in the side wall 30 of the valve chamber. The body section 19 is also in the form of a block which forms a cover for the valve chamber 12 and includes a cylindrical projection 31 which extends part way into the bore of the body section 18 and whose end face forms the other side wall 32 of the valve chamber. A suitable packing is provided between the housing sections 18 and 19, preferably in the form of a ring 31ᵃ lying in a groove extending around the projection 31 of the latter section.

The body section 19 is provided with fluid passages extending therethrough from the flat front face 23 to the inner face 32 thereof and which passages are here shown as consisting of a fluid pressure supply passage 33, fluid delivery and return passages 34 and 35, and an exhaust passage 36. The outer ends of these passages are surrounded by suitable packing rings 37 located in grooves of the flat front face 23 so that, upon mounting of the valve device 10 on a support containing a corresponding group of passages, the packing rings will form seals at the points of connection of the passages of the valve housing 11 with the passages of the support.

The fluid supply passage 33 of the housing is thus adapted to be connected with a fluid pressure supply passage of the support and the exhaust passage 36 is adapted to be thus connected with a passage leading to atmosphere or to a sump. The delivery passages 34 and 35 are thus adapted to be connected with passages leading to opposite ends of a fluid pressure cylinder or the like which is being controlled by the valve device 10.

The valve member 13 is one of the movable components and is here shown as being of a flat disk-shaped or wafer-like form and is supported for pivotal movement in the valve chamber 12 by a pivot shaft 38. As shown in Fig. 3 of the drawings, the valve member 13 is relatively thin, that is, of a thin axial length in relation to its diameter. The shaft 38 has one end thereof supported in an axial bore 39 of the body section 19 of the housing and its other end supported in an antifriction type of thrust bearing 40 which is located in the bearing pocket 29 of the body section 18. The use of the antifriction thrust bearing 40 in the location shown contributes to the mechanically balanced condition of the valve member 13 and to the ease of actuation thereof, as is further explained hereinafter.

The bearing pocket 29 is provided with extension recesses 41 and 42. A washer 43 located in the extension recess 41 and lying behind the thrust bearing 40 provides a means for ejecting this bearing from its pocket. For this purpose a threaded central opening 44 provided in the washer is engageable by a suitable extracting tool inserted through the thrust bearing 40 when the pivot shaft 38 has been removed.

As shown in Figs. 5 and 6, the valve member 13 comprises a disk-shaped body member 13ª and a cover plate 13ᵇ secured against one side thereof as by means of brazing and/or rivets or the like 45. The valve member also has thrust elements thereon comprising lever portions 47 and 48 located on opposite sides of the pivot axis of the valve member and which, in this instance, are shown as being arm portions projecting from the body member 13ª. The solenoids 14 and 15 co-operate with the arm portions 47 and 48 by applying actuating forces thereto for producing pivotal movement of the valve member 13 about the axis of the pivot shaft 38. As shown in Fig. 6, the thrust elements 47 and 48 are located axially of the valve member 13 so as to be centered on the transverse mid-plane thereof.

The valve member 13 is provided with fluid passages which, in number and location, are suitable for the control function to be performed by the valve device 10. When the valve device 10 is a four-way valve, as mentioned above and shown herein, the valve member 13 is provided with a pair of connecting passages 50 and 51 formed in the body portion 13ª and lying wholly inwardly of the peripheral edge thereof, and a pair of exhaust passages 52 and 53 also formed in the body portion 13ª and opening through the peripheral edge thereof. The passages 50, 51 and 52, 53 are preferably provided in the body 13ª by forming grooves in the latter and by securing the cover plate 13ᵇ to the body member in overlying relation to such grooves as shown in Figs. 5 and 6.

The cover plate 13ᵇ is provided with a pair of ports 54 and 55 forming the ends of the connecting passage 50, and is also provided with a second pair of such ports 56 and 57 forming the ends of the connecting passage 51. Additionally, the cover plate 13 is provided with a pair of exhaust ports 59 and 60 which form the inlet ends of the exhaust passages 52 and 53.

The fluid passages 33, 34 and 35 of the housing 11 have ports at their inner ends which communicate with the valve chamber 12 through the side wall 32 thereof for co-operation with the above-described ports of the valve member 13. The exhaust passage 36 has a port 36ª at the inner end thereof which is in open communication with the valve chamber 12 at all times. The ports at the inner ends of the fluid passages 33, 34 and 35 are formed by tubular sealing members 33ª, 34ª and 35ª which are located in counterbores 61 provided in the wall 32, as shown in Figs. 3 and 7, and are pressed against the cover plate 13ᵇ of the valve member by spring washers 62 located in such counterbores behind the tubular sealing members.

The ports 54, 55, 56, 57, 59 and 60 of the valve member 13 are so located on the valve member that they will register properly with the sealing members 33ª, 34ª and 35ª of the housing when the valve member is shifted to one or the other of its control positions in the valve chamber 12. Thus, when the valve member 13 occupies the position shown in Fig. 2, the port 54 will be in communication with the sealing member 33ª of the supply passage 33 and the port 55 will be in communication with the sealing member 35ª of the delivery passage 35 for supplying the pressure fluid to one end of the cylinder device being controlled.

The ports 56 and 57 will be idle at this time and will be out of register with any of the sealing members of the housing. The exhaust port 59 will, at this time, be in communication with the sealing member 34ª for connecting the other end of the cylinder device being controlled with the valve chamber 12 through the exhaust passage 52 of the valve member, and thence with atmosphere or the sump through the exhaust passage 36 whose open communication with the valve chamber is at a point outside of the perimeter of the valve member as shown in Fig. 2.

When the valve member 13 is swung about the axis of the pivot shaft 38 to its other control position, indicated by the broken line showing of the arm portions 47 and 48 in Fig. 2, the port 56 will be shifted into communication with the sealing member 33ª of the supply passage 33 and the port 57 will be in communication with the sealing member 34ª of the delivery passage 34. At this time, the exhaust port 60 of the valve member will be in communication with the sealing member 35ª of the delivery passage 35 for exhausting fluid from the cylinder device being controlled.

The solenoid devices 14 and 15 co-operate with the valve member 13 to shift the same from one to the other of the two control positions just described above for this member. These solenoid devices are of an identical construction each comprising a suitable magnet frame 65 and an energizing coil 66 thereon and having a central plunger passage 67. These solenoid devices include, as other movable components of the valve device 10, armatures or plungers 68 each having a stem portion 68ª shiftable in one of the plunger passages 67. Each solenoid device also includes a guide passage 69 in the lower portion thereof which communicates with the lower end of the plunger passage 67 and registers with the upper end of a guide passage 70 provided in the body unit 17 of the housing 11. The guide passages 70 communicate with the valve chamber 12 substantially tangentially thereof and on opposite sides of the pivot shaft 38, as shown in Figs. 2 and 3.

The solenoid devices 14 and 15 also include actuating members, in this case push pins 71 and 72, slidable in the guide passages 70 and having their lower ends in engagement with the arm portions 47 and 48 respectively of the valve member 13. The upper ends of the push pins 71 and 72 extend through the guide passages 69 of the solenoids 14 and 15 and are in engagement with the lower ends of the plunger stems 68ª. The push pins 71 and 72 also comprise movable components of the valve device 10.

The passages 70 of the housing 11 are provided with suitable packing rings and sleeve members 74 and 75 through which the push pins 71 and 72 extend, as shown in Fig. 2. The solenoids 14 and 15 are in a side-by-side relation in the chamber 16 and are secured to the body unit 17 by suitable attaching screws 76 to cause the sleeve members 75 to press the packing rings 74 into sealing engagement with the push pins 70 and 71.

The valve device 10 also includes suitable detent means for releasably holding the valve member 13 in the selected control position to which it has been moved. This detent means is here shown as comprising a detent ball 78 provided in a pocket 79 of the body section 19 and engageable with one or the other of two detent recesses 80 and 81 provided in the cover plate 13$^b$ of the valve member. The detent means also includes a compression spring 83 located in the pocket 79 and effective on the ball 78 for pressing the latter into one of the detent recesses of the valve member.

An important characteristic of the valve device 10 is that the valve member 13 is so formed and located in the valve chamber 12 that the areas of the valve member which are subjected to fluid pressure will provide a substantially fluid pressure balanced condition for the valve member. This pressure balanced condition of the valve member contributes to the ease of operation thereof for movement of the valve member to its different control positions.

Another important characteristic of the valve device 10 is that the valve member 13 is stable or mechanically balanced at all times so that the valve member will not be subject to accidental shifting nor to binding or other erratic functioning, due to strong and sudden impulse forces or rapid accelerating movements and directional changes to which the valve device may be subjected. The armatures of the solenoid devices 14 and 15, and the associated push pins 71 and 72, are also in a stable or mechanically balanced condition. This stable and balanced condition of the valve member and its solenoid-type actuating means thus enables the device to perform satisfactorily under severe service conditions where the device may be subjected to sudden impulse forces of a magnitude equivalent to 400 G's or more.

To further explain the stable and mechanically balanced condition of the valve member 13 and its solenoid actuating means, it is pointed out that the thrust applied to the valve member axially thereof by the sealing members 33$^a$, 34$^a$ and 35$^a$ and by the detent ball 78 are absorbed and balanced by the thrust bearing 40, so that no excessive axial shifting of the valve member will occur under any sudden impulse force applied to the valve device 10. The valve member is likewise in a stable and mechanically balanced condition in all directions transversely of the pivot shaft 38 because the valve member is of a symmetrical form with respect to the lever portions 47 and 48 and also with respect to the size, shape and location of the fluid passages and ports of the valve member. The valve member will therefore have no unbalanced mass tending to cause rotation or excessive axial shifting thereof in response to any sudden impulse forces acting on the device.

With respect to the solenoid devices 14 and 15 and the push pins 71 and 72 thereof, it will be recognized that these are disposed in a symmetrical relation to the axis of the pivot shaft 38 and that the push pins are movable along parallel paths and transmit thrust in opposite directions to and from the arm portions 47 and 48 of the valve member 13. It will accordingly be seen that any impulse forces acting on the valve device 10 in a direction vertically transversely of the pivot shaft 38, will have no tendency to produce shifting of the valve member 13 inasmuch as the push pins 70 and 71 and the solenoid armatures will counterbalance each other through the pivotally mounted valve member. Any impulse forces applied to the valve device 10 in a direction horizontally transversely of the pivot shaft 38, or in a direction axially of the pivot shaft, will produce no excessive shifting of any of the parts of the solenoid devices nor of the valve member itself because none of these components are free to shift except for minor working tolerances, and consequently, no accidental movement or erratic functioning of the valve member will be produced by such impulse forces.

It will now be understood from the accompanying drawings and the foregoing detailed description that this invention provides a valve device having a simple construction with a desired ease of operation for the valve member and that the movable components of the device are in a stable and mechanically balanced condition at all times, such that strong and sudden impulse forces to which the device may be subjected will have no tendency to produce accidental shifting nor erratic functioning of the valve member even though such impulse forces are equivalent in magnitude to 400 G's or more.

It will also be observed from Fig. 3 of the drawings that the transverse mid-plane of the disk-shaped valve member 13, which is normal to the rotation axis of the valve member, is also the mid-plane of the push pins 71, 72 and of the solenoid plungers 68. All of these movable components are also symmetrical with respect to this transverse mid-plane and are therefore in a balanced arrangement and are devoid of any overhanging or offset masses which would tend to cause cocking or tilting of these components, with a resultant binding or dragging action, during functioning of the valve device 10 while it happens to be subjected to a strong impulse force or a strong inertia effect produced by rapid acceleration or by a sudden change of directional movement thereof. From what has been explained above about the balanced condition of the movable components of the valve device 10, it will therefore be seen that the movable parts are not only in a statically balanced relation around the pivot axis of the valve member 13, but the shapes and arrangement of the movable components are also such that their mass distributions shown in the drawings locates their centers of gravity in the above-mentioned common transverse mid-plane.

It will be further recognized from the construction shown in the drawings and described above that, in addition to the transverse mid-plane of the valve member 13, there are two axial planes which, as other reference planes, can be conveniently referred to in explaining the balanced condition of the valve device 10. These axial planes are a first axial plane which includes the pivot axis of the valve member 13 and lies midway between the solenoids 14 and 15, and a second axial plane which includes the pivot axis of the valve member 13 and extends perpendicular to the first axial plane.

Rapid accelerating movement of the valve device 10, as a whole, in directions normal to such second axial plane are the ones which would particularly tend to produce undesired shifting or actuation of the movable components by resulting inertia action or forces but, since the movable components are in a symmetrical and mass-balanced condition with respect to said first axial plane, no such undesired actuation or shifting will occur. Other rapid accelerating movements of the valve device 10 in directions normal to the first axial plane, and in directions normal to the transverse mid-plane of the valve member 13, would be less likely to interfere with the proper actuation of the valve member because they would only produce sticking or binding tendencies, inasmuch as the movable components are confined against any excessive shifting in directions along and across the pivot axis, as has been explained above. Moreover, since the construction shown in the drawings and described above provides an arrangement for the movable components in which they are symmetrical in form and location with respect to the first axial plane and are also symmetrical in form and location with respect to the transverse midplane of the valve member 13, accelerating movements of the valve device 10 in directions normal to the first axial plane and normal to such transverse mid-plane will not be likely to produce any cocking or tilting of the valve member nor any undesired pivotal actuation thereof.

Although the valve device of the present invention has been illustrated and described herein to a somewhat detailed extent, it will be understood, of course, that the invention is not to be regarded as being limited correspondingly in scope but includes all changes and modifications coming within the terms of the claims hereof.

Having described my invention, I claim:

1. A valve device of the character described comprising a housing having fluid supply and exhaust passages and also containing a valve chamber and a solenoid chamber in adjacent relation; said housing being formed of connected sections comprising a body portion containing said valve chamber, and a cover section containing said solenoid chamber; pivot means in said body portion providing a pivot axis substantially centrally of said valve chamber; a valve member supported by said pivot means for pivotal movement in said valve chamber for controlling said fluid passages; said valve member having thrust elements thereon located on opposite sides of said pivot axis and offset equal lever-arm distances from the pivot axis; solenoids in said solenoid chamber and each having an armature reciprocably movable in opposite directions along paths offset equal distances on opposite sides of said pivot axis; said body portion having guide passages extending between said solenoid chamber and said valve chamber; said guide passages being aligned with the thrust elements of said valve member and the paths of the reciprocatory movement of said armatures; and push pins slidable in said guide passages for transmitting actuating thrust from said armatures to said valve member for pivotally swinging the latter alternately in opposite directions in response to alternate energization of said solenoids; said valve member, armatures and push pins comprising movable components and all being substantially symmetrical in form and location with respect to the transverse mid-plane of the valve member and with respect to a first axial mid-plane of the device which includes said pivot axis and lies midway between said guide passages and solenoids; the materials comprising said movable components having a predetermined mass distribution providing a condition of balance for the masses thereof lying on opposite sides of said transverse plane and a condition of balance for the masses thereof lying on opposite sides of said first axial plane, for minimizing inertia effects on said movable components resulting from rapid accelerating movements and sudden directional changes of said device as a whole.

2. A valve device as defined in claim 1 wherein said valve member is disk-shaped and of thin axial length in relation to its diameter; and wherein the centers of gravity of said valve member, armatures and push pins lie in said transverse mid-plane.

3. A valve device as defined in claim 1 wherein said guide passages and armature paths on opposite sides of the pivot axis are parallel; and wherein said armatures and their associated push pins are of substantially equal masses.

References Cited in the file of this patent

UNITED STATES PATENTS

| | | |
|---|---|---|
| 467,153 | Chatard | Jan. 19, 1892 |
| 579,249 | Ackerman | Mar. 23, 1897 |
| 802,946 | Waterman | Oct. 24, 1905 |
| 2,643,677 | MacLean | June 30, 1953 |
| 2,750,960 | Hansen et al. | June 19, 1956 |

FOREIGN PATENTS

| | | |
|---|---|---|
| 9,354 | Great Britain | Apr. 22, 1907 |
| 263,754 | Germany | Sept. 11, 1913 |